United States Patent
Kress

(10) Patent No.: US 6,536,997 B1
(45) Date of Patent: Mar. 25, 2003

(54) PROCESS FOR CHIP-REMOVING MACHINING OF BORE SURFACES

(75) Inventor: Dieter Kress, Aalen (DE)

(73) Assignee: Mapal, Fabrik fur Prazisionswerkzeuge Dr. Kress KG (DE)

( * ) Notice: Subject to any disclaimer, the term of this patent is extended or adjusted under 35 U.S.C. 154(b) by 0 days.

(21) Appl. No.: 09/660,783

(22) Filed: Sep. 13, 2000

(30) Foreign Application Priority Data

Sep. 14, 1999 (DE) .......................... 199 43 990

(51) Int. Cl.⁷ .............................................. B23B 35/00
(52) U.S. Cl. ......................... 408/1 R; 408/54; 408/81; 408/708
(58) Field of Search ................. 408/1 R, 54, 708, 408/80, 81, 82, 83, 89

(56) References Cited

U.S. PATENT DOCUMENTS

| | | | | |
|---|---|---|---|---|
| 3,751,175 A | * | 8/1973 | Brooks ........................ | 408/80 |
| 4,571,129 A | * | 2/1986 | Strand ........................ | 408/54 |
| 4,652,186 A | * | 3/1987 | Sverdlin ...................... | 408/81 |
| 4,666,350 A | * | 5/1987 | Nicholas ..................... | 408/82 |
| 4,701,081 A | * | 10/1987 | Hashimoto et al. ........ | 408/1 R |
| 5,417,525 A | * | 5/1995 | Lenhart ...................... | 408/708 |
| 5,788,434 A | | 8/1998 | Harmand | |
| 5,957,630 A | * | 9/1999 | Endsley et al. ............. | 408/83 |

FOREIGN PATENT DOCUMENTS

| | | |
|---|---|---|
| DE | 623 253 | 12/1935 |
| EP | 0 552 425 A1 | 7/1993 |
| EP | 0 970 770 A1 | 1/2000 |
| JP | 33210 A * | 4/1981 |
| JP | 4504 A * | 1/1987 |
| SU | 691248 A * | 10/1979 .................. 408/54 |

* cited by examiner

*Primary Examiner*—Daniel W. Howell
(74) *Attorney, Agent, or Firm*—Morriss, Bateman, O'Bryant & Compagni

(57) ABSTRACT

A process is proposed for chip-removing machining of bore surfaces spaced at a distance from one another in axial direction, particularly of crankshaft and/or camshaft bearing bores, in which at least one of the two outermost bore surfaces is machined to produce a bearing surface for the machining of additional bore surfaces, and a boring bar is inserted through one of the machined outermost bores into at least one bore lying between the outermost bore surfaces.

33 Claims, 7 Drawing Sheets

PROCESS FOR CHIP-REMOVING MACHINING OF BORE SURFACES

RELATED APPLICATIONS

The present application claims priority to German Pat. App. No. 19943990.7, filed Sep. 14, 1999.

The invention relates to a process for chip removing machining of bore surfaces that are spaced at a distance from one another in axial direction, particularly of crankshaft and/or camshaft bearing bores, in accordance with Claim 1.

For the machining of bore surfaces of the type addressed here, particularly crankshaft and/or camshaft bearing bores, a long boring bar is used, which is inserted into the bore to be machined. The boring bar is guided with the aid of guide bushes, which are positioned very precisely in relation to each other and are arranged in front of the first bore surface or after the last bore surface as viewed in the feed direction of the boring bar. Frequently, an additional guide bush disposed in the area between the two outermost bore surfaces is used. This guidance of the boring bar is to ensure that the bores are in alignment with one another, i.e., that they are precisely radially aligned in relation to one another, which is crucial particularly in crankshaft/camshaft bearing bores for the performance of the engine. It has been shown, however, that in the known processes for the machining of bore surfaces, the mean position of the bore center does not always meet these requirements.

Thus, it is the object of the invention to define a process for machining bore surfaces that are spaced at a distance from one another in axial direction, which will ensure a high alignment accuracy of the bores.

To attain this object, a process with the features of Claim 1 is proposed. This process is distinguished in that the surface of at least one of the two outermost bores is machined first to produce a bearing surface for machining additional bore surfaces. Finally, a boring bar is inserted through one of the machined outermost bores into at least one of the bores lying between the outermost bore surfaces. To machine the bore surfaces, the boring bar comprising at least one cutting device is set into rotation and displaced in axial direction. Since the boring bar is guided within at least one of the two outermost bore surfaces that have already been finished, a high alignment accuracy of the bores can be ensured.

A particularly preferred embodiment of the process provides that both outermost bore surfaces be machined. The boring bar is preferably inserted into all the bores, i.e., into the two outermost bores previously machined for the purpose of supporting the boring bar as well as into the bores arranged therebetween. The two outermost bore surfaces that serve as the bearing surfaces or bearings center the boring bar. Subsequently the remaining bores are machined by at least one cutting device through a rotary and translatory motion of the boring bar. Centering the boring bar makes it possible to realize a very precise mean position of the bore center. In other words, a high alignment accuracy of the bores is ensured.

An advantageous embodiment provides that one of the outermost bore surfaces is machined first and the workpiece with the bore surfaces, for example a crankshaft housing, is then pivoted 180° about an axis into a second machining position in which the other outermost bore surface can be machined. This procedure makes it possible to machine the two outermost bore surfaces using the same tool without having to shift the tool into a different working position. The pivoting axis preferably extends in vertical direction, i.e., radially to the longitudinal center axis of the bores.

A further development of the invention provides that the boring bar is inserted through one of the machined bores and an opposite tool is inserted through the opposite outermost bore and that the two are coupled together. According to a first variant it is provided that the outside diameter of the opposite tool is adapted to the diameter of the outermost machined bore in such a way that the opposite tool is very precisely centered or guided through the bore. According to a second variant it is provided that the outside diameter of the opposite tool is smaller than the diameter of the outermost machined bore and that the opposite tool comprises a guide element with several guide bars distributed over the circumference of the opposite tool and spaced at a distance from one another. The guide bars are designed so that they can be retracted into and extended from the opposite tool. Before or after the opposite tool is inserted into the bore, the guide bars are changed from a retracted to an extended position in which they are supported against the bore surface to guide and center the opposite tool within the bore. In both these variants, the boring bar is centered and guided by suitable means within the opposite outermost machined bore.

The coupling of the boring bar and the opposite tool can be rotationally fixed in such a way that if a driving or braking torque is applied to the boring bar, the opposite tool is carried along, or if a torque is applied to the opposite tool, the boring bar is carried along, so that the opposite tool or the boring bar also rotates. Hence, the coupling can be effected in such a way that if the boring bar is shifted in the direction of its longitudinal axis, the opposite tool is also shifted back and forth.

Of course, the connection between boring bar and opposite tool can also be designed in such a way that the two parts are exclusively centered in relation to each other, so that the opposite tool is not carried along if the boring bar is rotated and possibly shifted in axial direction. In this case, the opposite tool remains stationary as the bore surface is machined.

A further embodiment of the process is distinguished in that a guide sleeve is used as the opposite tool, which is coupled with the front end of the boring bar—as seen in insertion direction of the boring bar—after the boring bar has been inserted into the bore. This coupling is preferably effected by pushing the front end of the boring bar into the guide sleeve arranged in the outermost bore or by pushing the guide sleeve onto the front end of the boring bar. The front end of the boring bar is freely movable within the guide sleeve in axial and circumferential direction. The guide sleeve is designed in such a way that in its mounted state it reaches at least into the outermost machined bore, or reaches completely through it.

Furthermore, in an additional embodiment of the process, it is provided that the boring bar is eccentrically inserted into the bores. For this purpose, e.g., the boring bar is lowered or raised, e.g., by 2 mm to 3 mm, while the component with the bore surfaces to be machined, e.g., a cylinder block or camshaft housing, is kept stationary in a fixed position. After the boring bar has been inserted into the bore, it is raised or lowered again, set into rotation, and moved in axial direction in order to machine the bore surfaces. In this embodiment, the at least one cutting device can be fixedly mounted to the boring bar. It is also possible, however, that the at least one cutter of the cutting device is designed to be retracted into and extended from the boring bar. If a boring bar with radially displaceable cutters is used, an eccentric insertion of the boring bar into the bores may possibly be dispensed with, i.e., the boring bar, which has a smaller diameter than the bore surfaces to be machined, is brought into a position in which it is aligned with the two outermost machined bores and is then inserted into the bores. Another embodiment of the process provides that the workpiece with the bores is raised or lowered for the eccentric insertion of the boring bar into the bores, and that only after the boring bar has been inserted into the bores, the workpiece is raised or lowered again to a sufficient extent that the longitudinal center (rotary) axis of the boring bar is aligned with the longitudinal center axis of the bores. In this case the boring bar is in a fixed position, at least while it is being inserted into the bores.

Also preferred is an embodiment of the process in which the remaining bore surfaces that are arranged between the outermost bores are machined simultaneously. The boring bar comprises a respective cutting device for the bore surfaces arranged between the outermost bore surfaces, so that all the bore surfaces between the outermost machined bore surfaces are machined simultaneously as the boring bar rotates about its longitudinal axis and is displaced in the direction of its longitudinal axis. This makes it possible to reduce the boring bar machining time. With this simultaneous machining of all the bores and possibly an offset arrangement of the cutting device—as seen in circumferential direction of the boring bar—a balance of the forces can be achieved.

In another embodiment of the boring bar, the boring bar is provided with only one cutting device for all the bore surfaces to be machined. With this boring bar, the bores arranged in series are machined successively.

Finally, another embodiment of the process is preferred, which is distinguished in that the bore openings are provided with first and second chamfers through a back or forth movement of the boring bar in the direction of its longitudinal axis. Chamfering of the bore openings can be done before or after the bore surface is machined. For this purpose, the boring bar has at least one, preferably several cutters respectively assigned to a bore surface, which can be displaced in radial direction beyond the bore surface. Preferably, the same cutting device is used to machine the bore surface and to chamfer the openings of the bore.

Additional advantageous embodiments of the process are set forth in the other dependent claims.

Below, the invention will now be described in greater detail by means of the drawings in which.

Boring bars of the type discussed here are generally suitable for machining bore surfaces that are spaced at a distance from one another in axial direction. The following discussion assumes, merely by way of example, that the boring bar is intended to machine bearing bore surfaces for crankshafts and/or camshafts.

Figure 1:
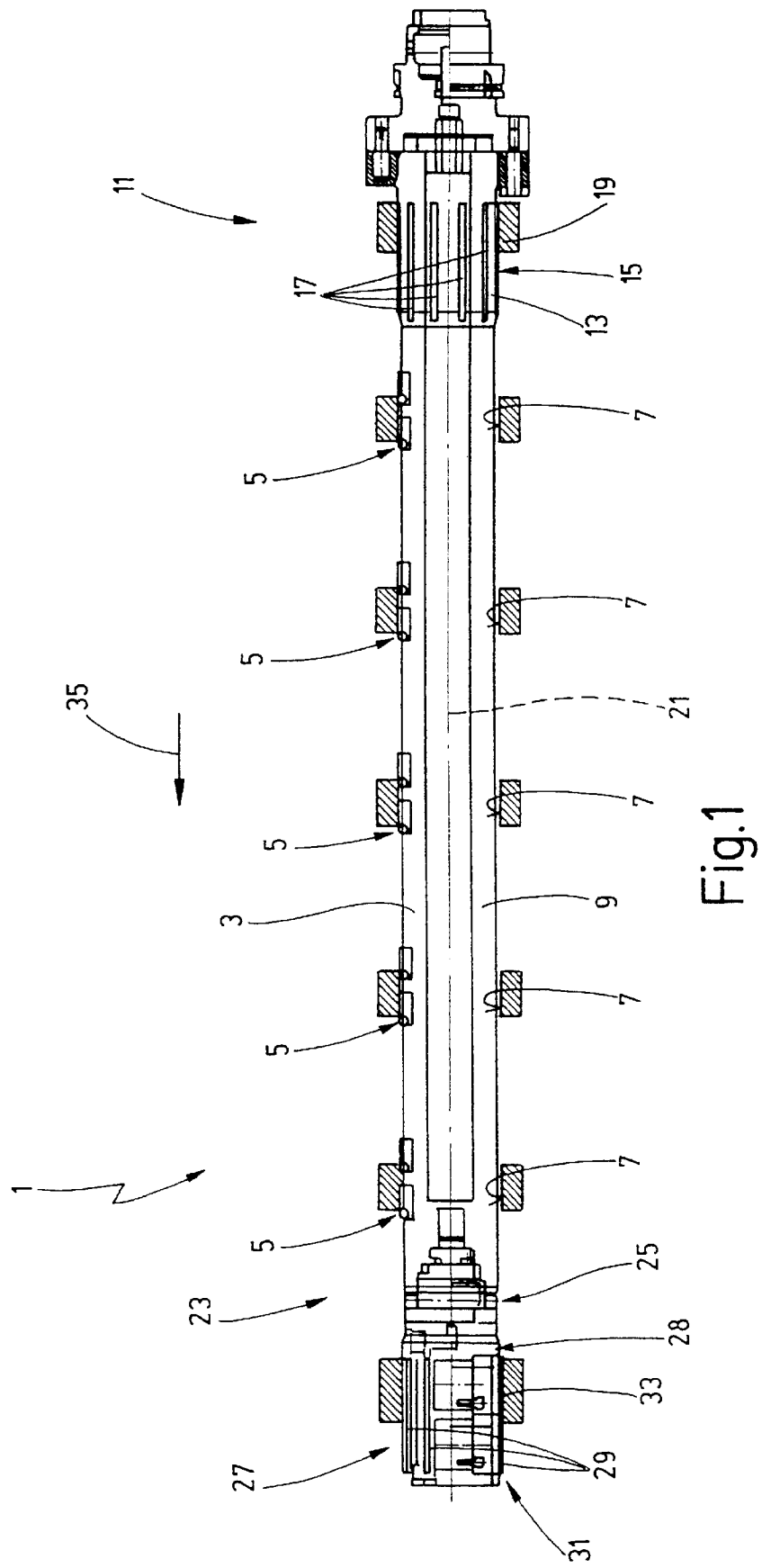
FIG. 1 is a longitudinal section through a first embodiment of a boring bar.

FIG. 1 shows a longitudinal section of a first embodiment of a boring bar 1 comprising a basic body 3, which is cylindrical and has a substantially circular cross-section. In this case, several cutting devices 5 are distributed over the length of the basic body 3. The cutting devices 5 have a predefined spacing in axial direction of the boring bar 1, which corresponds to the spacing of the bearing bores 7 with respect to one another. FIG. 1 shows the cutting devices 5 in two positions; on the left, the cutting device 5 is shown in its position after the bearing bore 7 has been machined.

The basic body 3, in the area of a first longitudinal segment 9, has an outside diameter that is smaller than the diameter of the bearing bores 7 prior to being machined by the boring bar 1. At its rear end 11, where the boring bar 1 is coupled with the drive of a machine tool, not depicted, the basic body 3 has a second longitudinal segment 13 in the area of which the outside diameter of the basic body 3 is greater than in the area of the first longitudinal segment 9. Here, the interface to the drive is formed by a hollow shaft coupling connected with the boring bar 1, whereas in the embodiment depicted in FIG. 2, the interface comprises a clamping cone.

Hence, in the area of the second longitudinal segment 13, the boring bar 1 has a guide element 15 comprising several guide bars 17 distributed over the circumference of the basic body 3 and spaced at a distance from one another. The guide element 15 serves to guide the boring bar 1 or the basic body 3 within a further outermost bearing bore 19 so that it is rotationally and longitudinally movable. The outermost bearing bore 19 is machined before the boring bar 1 is inserted into the bearing bores and serves as a first support for the boring bar 1.

The length of the guide bars 17 extending parallel to the longitudinal center axis 21 of the boring bar 1 is greater than the sum of the width of the outer bearing 19 and the distance by which the boring bar 1 is displaced in the direction of its longitudinal center axis 21 for machining the bearing bores 7. This makes it possible to ensure a secure and, in the area of the outermost bearing bore 19, a tilt free guidance of the boring bar 1 during the machining of the bearing bores 7.

At its front end 23 located opposite the drive side, the boring bar 1 is detachably coupled with an opposite tool 27 via a coupling element 25, which in this case is formed by a hollow shaft coupling (HSK). The opposite tool 27 comprises a basic body 28, in which a guide element 31 with several guide bars 29 is integrated the structure of which may correspond to that of guide element 15. The guide bars 29 extending parallel to the longitudinal center axis 21 of the boring bar 1 project beyond the outside surface of the basic body 28. The opposite tool 27 is guided in the other outermost bearing bore 33 with the aid of guide element 31 so as to be rotationally and longitudinally movable. The length of the guide bars 29 is greater than the sum of the width of bearing bore 33 and the distance by which the boring bar 1 is displaced in the direction of its longitudinal center axis 21 in order to machine the bearing bores 7 that are arranged between the outermost bearing bores 19, 33 by means of the cutting devices 5. Before the opposite tool 27 is inserted into the bearing bore 33, bearing bore 33 is first machined to produce a bearing surface.

A first variant provides that the guide bars 29 or 17 of the guide elements 31, 15 are designed to be displaceable in radial direction. Another variant provides that the guide bars 29 and/or the guide bars 17 are fixedly mounted or spring-mounted to the opposite tool 27 or the basic body 3, i.e., the guide bars 17, 29 are either pushed radially outwardly with a defined force in the direction of the boring bar by means of a spring element or are fixedly mounted to the boring bar. This is similarly true for the cutting devices 5 or their at least one cutter, which can be mounted to the basic body 3 so as to be radially displaceable or fixed.

The above-described process will now be explained in greater detail. First, the two outermost bearing bores 19 and 33 are machined to produce a bearing surface each for the guide element 15 of the basic body 3 and the guide element 31 of the opposite tool 27. Preferably, the bearing bores 19, 33 are already machined to the specified diameter of the bearing bores and, possibly, the desired surface finish. Prior to inserting the boring bar 1 into the bearing bores 19, 7, the boring bar 1 is lowered to a sufficient extent so that its longitudinal center axis 21 is located below the center of the bearing bores. The basic body 3 of the boring bar 1 is then eccentrically inserted through the outermost bearing bore 19 arranged on the drive side of the boring bar 1 into the bearing bores 7 that are arranged between the two outermost bearing bores 19, 33. Finally, the boring bar 1 is raised again so that its longitudinal center axis is aligned with the center of the bearing bore 19 and is inserted into the machined bearing bore 19 far enough until the second longitudinal segment 13 of the boring bar 1 with the guide element 15 is guided and centered within the outermost previously machined bearing bore 19. The opposite tool 27 is inserted into the outermost bearing bore 33 opposite the bearing bore 19. In the clearance between the outermost bearing bore 33 and the bearing bore 7 arranged adjacent and spaced at a distance thereto, the opposite tool 27 and the boring bar 1 are coupled together with the aid of the coupling element 25.

The coupling of the opposite tool 27 with the boring bar 1 causes the boring bar 1, now supported at both ends, to be centered which permits a highly accurate alignment of the bearing bores arranged in series.

The eccentric insertion of the boring bar 1 into the bore can also be realized in that the workpiece is lowered to a specified extent and is then raised again after the boring bar has been inserted.

By way of example only, it is assumed that the feed motion of the boring bar 1 to machine the bearing bores 7 occurs in the direction of an arrow 35, that is, toward the left in FIG. 1. The arrangement of the boring bar 1 prior to machining the bearing bores is selected such that the cutting devices 5 are arranged in front of the bearing bores 7, i.e., to the right thereof as seen in FIG. 1. For chip-removing machining of the bearing bores 7, a driving torque is applied to the boring bar 1, which is displaced in the direction of its longitudinal center axis 21, i.e. toward the left in FIG. 1. This also causes the opposite tool 27 guided in the bearing bore 33 and set into rotation by the boring bar 1 to be displaced in longitudinal direction. The displacement path of the boring bar 1 is at least as long as the width of the bearing bores 7 or the width of the widest bearing bore 7.

Figure 2:
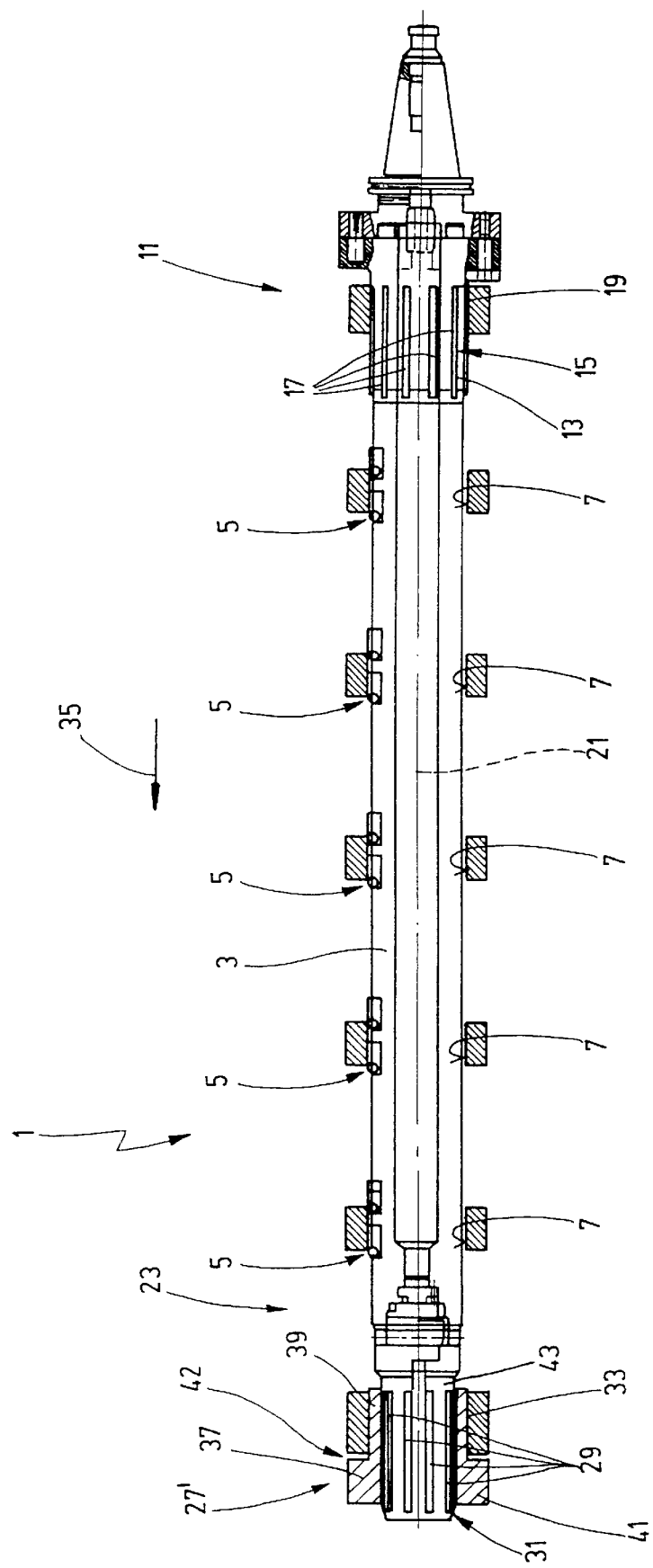
FIG. 2 is a longitudinal section through a second embodiment of the boring bar.

FIG. 2 shows a further exemplary embodiment of the boring bar 1 in a longitudinal section. Identical parts are provided with identical reference symbols so that in this respect reference can be made to the description of FIG. 1. Below, only the differences are discussed in greater detail. The opposite tool 27' in this case is formed by a guide sleeve 37 which has a first longitudinal segment 39 with a smaller diameter and a second longitudinal segment 41 with a larger diameter. In the area of the first longitudinal segment 39, the guide sleeve 37 has an outside diameter that is, essentially, equal to the diameter of the outermost, machined bearing bore 33. Since the outside diameter of the second longitudinal segment 41 is greater than that of the first longitudinal segment 39, a limit stop 42 is formed so that the guide sleeve 37 can be inserted in a defined manner into the bearing bore 33. The diameter of the through hole of the guide sleeve 37 is smaller than the diameter of the bearing bores 7 prior to their machining by the boring bar 1.

On its front end 23 opposite the drive side, the boring bar 1 has a longitudinal segment 43 that can be pushed into the through hole of the guide sleeve 37. In the region of the longitudinal segment 43 a guide element 31 is provided which guides and centers boring bar 1 within guide sleeve 37. The outside diameter of the longitudinal segment 43 is smaller than the diameter of the bearing bores 7 before they are machined by boring bar 1. The longitudinal segment 43 is guided within guide sleeve 37 so as to be rotatable and longitudinally displaceable. Thus, when boring bar 1 is displaced, the guide sleeve 37 is not carried along but remains in a fixed position inserted in the bearing bore 33.

For chip-removing machining of the bearing bores 7 with the boring bar 1 described by means of FIG. 2, the two outermost bearing bores 33 and 19 are again machined first, e.g., bored and possibly ground, to produce a bearing surface each. Then, the boring bar 1 is eccentrically inserted into the bearing bores 7 through the outermost bearing bore 19 arranged on the drive side. Prior to inserting the front end of the boring bar 1 with the longitudinal segment 43 into the through hole of the guide sleeve 37 that is inserted into the other outermost machined bearing bore 33, the boring bar 1 is shifted into a position aligned with the center of the bearing bore 33.

An additional variant provides that the cutters of the cutting device 5 can be displaced in radial direction in relation to the basic body 3 such that the boring bar 1 may not have to be raised or lowered in order to be inserted into the bearing bores. For this purpose, the boring bar is brought into a position in which its longitudinal center axis 21 is aligned with the center of the bearing bore 33. During insertion, the cutters of the cutting device are in their retracted position to avoid a collision with the bearing bores 7 that are to be machined. The cutters and/or the guide bars of the guide elements 15, 31 may be displaced, for example, by means of a coolant for the boring bar 1.

In an advantageous embodiment of the process for machining the bearing bores, it is provided that the openings of the bearing bores 7 are chamfered by moving the boring bar 1 back or forth in the direction of its longitudinal center axis 21. For this purpose the cutters of the cutting devices 5 are designed to be radially displaceable in such a way that they are displaced beyond the specified dimension of the bearing bores, either after or before the bearing bore surface is machined.

To achieve a short bearing bore machining time, the inner bearing bores 7 can be premachined, for example roughmachined, at the same time as the two outermost bearing bores 19, 33 are machined to produce bearing surfaces for the boring bar 1.

Figure 3:
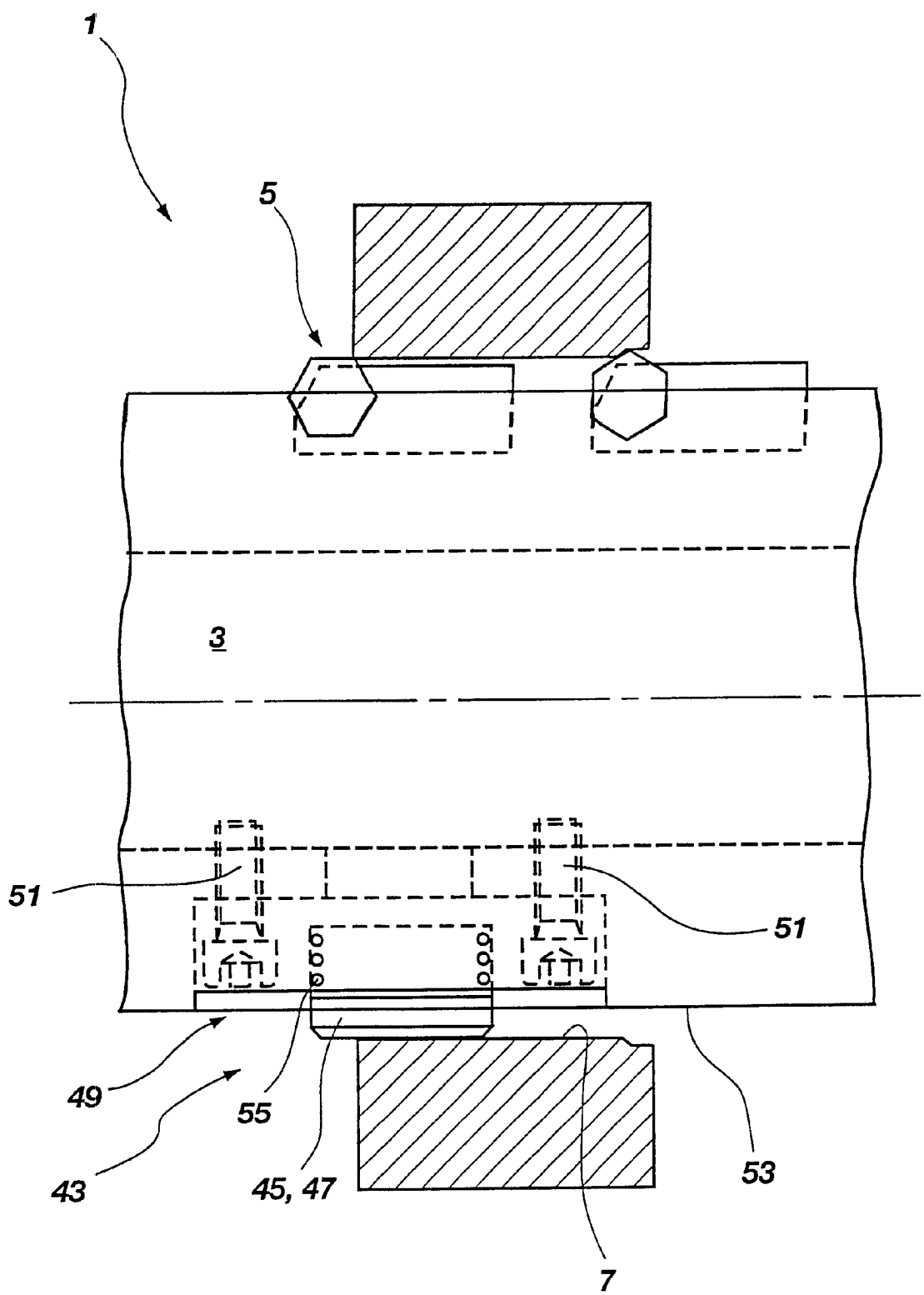
FIG. 3 is a detail of a further embodiment of the boring bar.

FIG. 3 shows a detail of a further embodiment of the boring bar 1 providing for an additional guide element 43 that comprises at least one guide element 45, which in this case is formed by a guide bar 47. The guide bar 47 is arranged on a holder 49 that is detachably connected with the basic body 3 of the boring bar 1 with the aid of fastening means, in this case screws 51. Here, the guide bar 47 is essentially arranged on the side of the boring bar 1 opposite the cutting device 5 and serves to reduce the vibrations of boring bar 1 during machining of the bearing bores 7. The guide bar 47 protruding beyond the outside 53 of the boring bar 1 can be rigid, i.e., fixed in relation to the basic body 3 of the boring bar 1. It is also possible that the guide bar 47 is spring-mounted so that it can be pressed against a spring force into a seat 55 in holder 49. The guide element 43 can of course also be provided with several guide bars 47 that are distributed over a circumferential area of the boring bar 1, and the guide bars 47 can be fixed or spring-mounted. The guide element 43 described by means of FIG. 3 can be readily used in connection with a boring bar 1 described by means of FIGS. 1 and 2.

In an advantageous exemplary embodiment of the boring bar 1, a guide element 43, which can have one or several guide bars, is assigned to at least one of the bearing bores 7 arranged between the outermost bearing bores 19, 33. Of course, it is also possible that one guide element 43 is assigned to several of the bearing bores 7. It is also feasible that one guide element 43 is assigned to all bearing bores 7.

In a further advantageous exemplary embodiment of the boring bar, the guide element 43 comprises at least one spring mounted and extendable guide bar and at least one fixedly mounted guide bar. In this connection, "extendable" should be understood to mean that the guide bar can be retracted into and extended from the basic body 3 of the boring bar 1 to a defined degree, for example by means of a hydraulic actuation device.

In summary, it remains to be noted that the use of the two outermost machined bearing bores 19, 33 as bearing surfaces for the boring bar 1 permits a highly accurate centering of the boring bar 1. This makes it possible to ensure a very accurate mean position of the bore center of the bearing bores 7, 19, 33. It has been shown that the above process for chip-removing machining of bearing bores ensures a higher alignment accuracy of the bearing bores than that possible with conventional processes for the machining of bearing bores.

Figure 4:
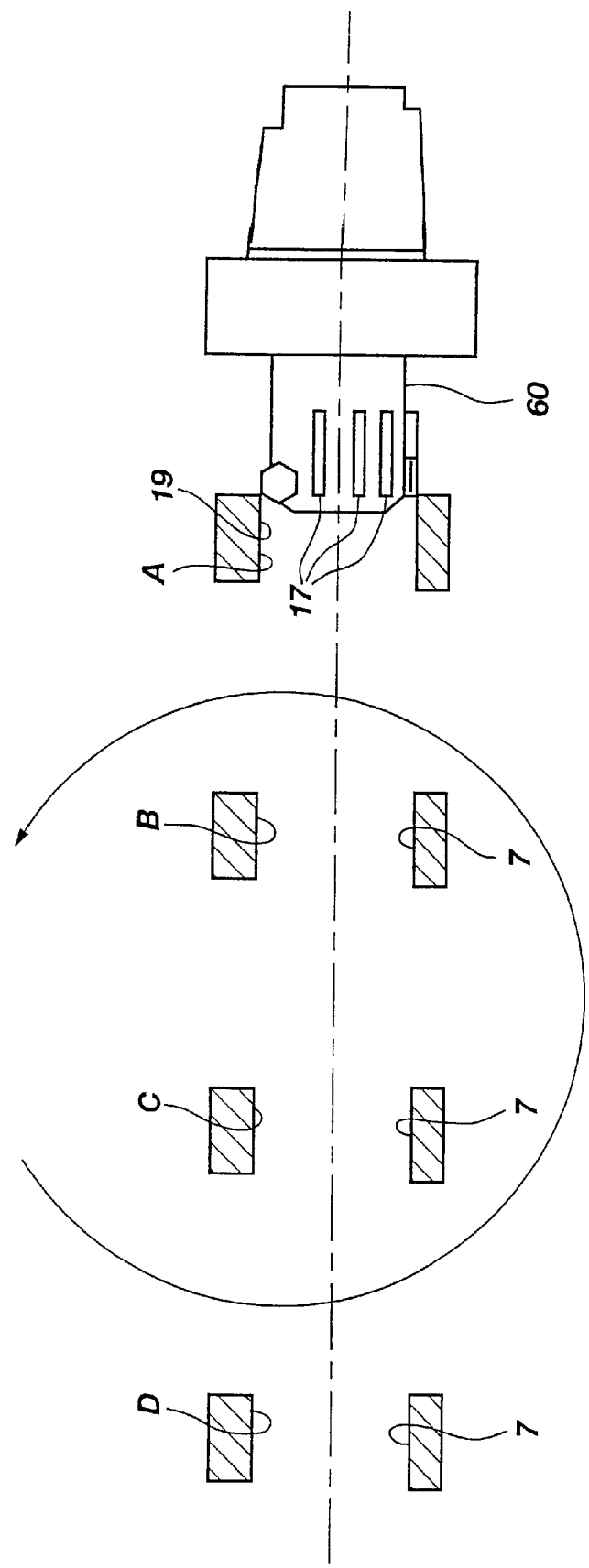
FIG. 4 is a longitudinal section through a fifth embodiment of the boring bar.

FIG. 4 shows the bearing bores 7 and 19 (separately enumerated as A, B, C, and D) as also illustrated in FIG. 1. A finishing machining tool 60 having a plurality of guide bars 17 is positioned to enter the outermost bearing bore 19. The bearing bore 19 is machined to achieve the stop measure and surface quality. As indicated by the arrow, after machining the baring bore 19, the work piece is pivoted 180 degrees.

Figure 5:
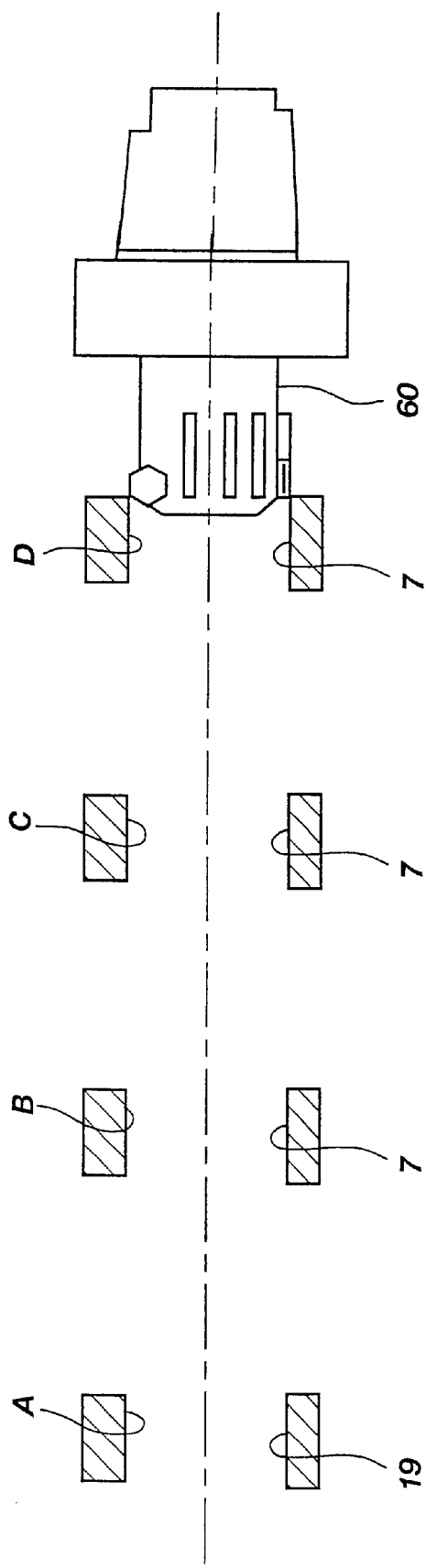
FIG. 5 is a longitudinal section through the boring bar of FIG. 4 with the workpiece rotated 180 degrees.

As shown in FIG. 5, the second outer bearing bore D is machined using the same tool 60.

Figure 6:
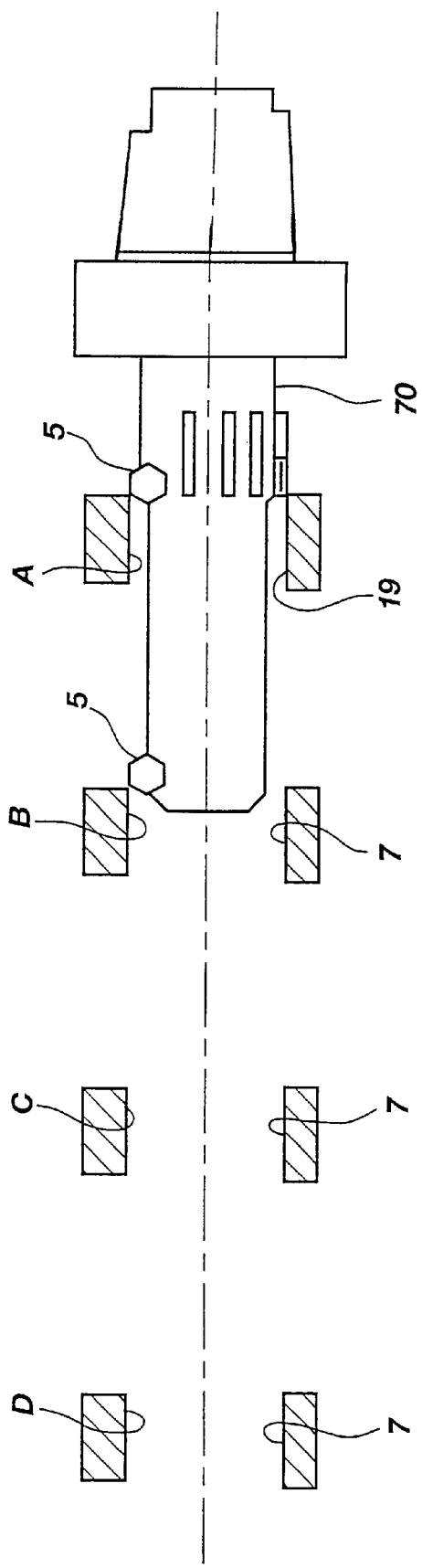
FIG. 6 is a longitudinal section through a sixth embodiment of the boring bar.

FIG. 6 shows a special tool 70 for machining the outer bearing bore 19 while simultaneously machining the inside baring bores 7. The number of cutting devices 5 of the tool 70 is related to the number of bearing bores being simultaneously machined. Having a work piece with four bearing bores, a tool 70 may be used to allow the machining of one half of the bearing bores from one side of the work piece and the other half of the bearing bores from the other side of the work piece.

Figure 7:
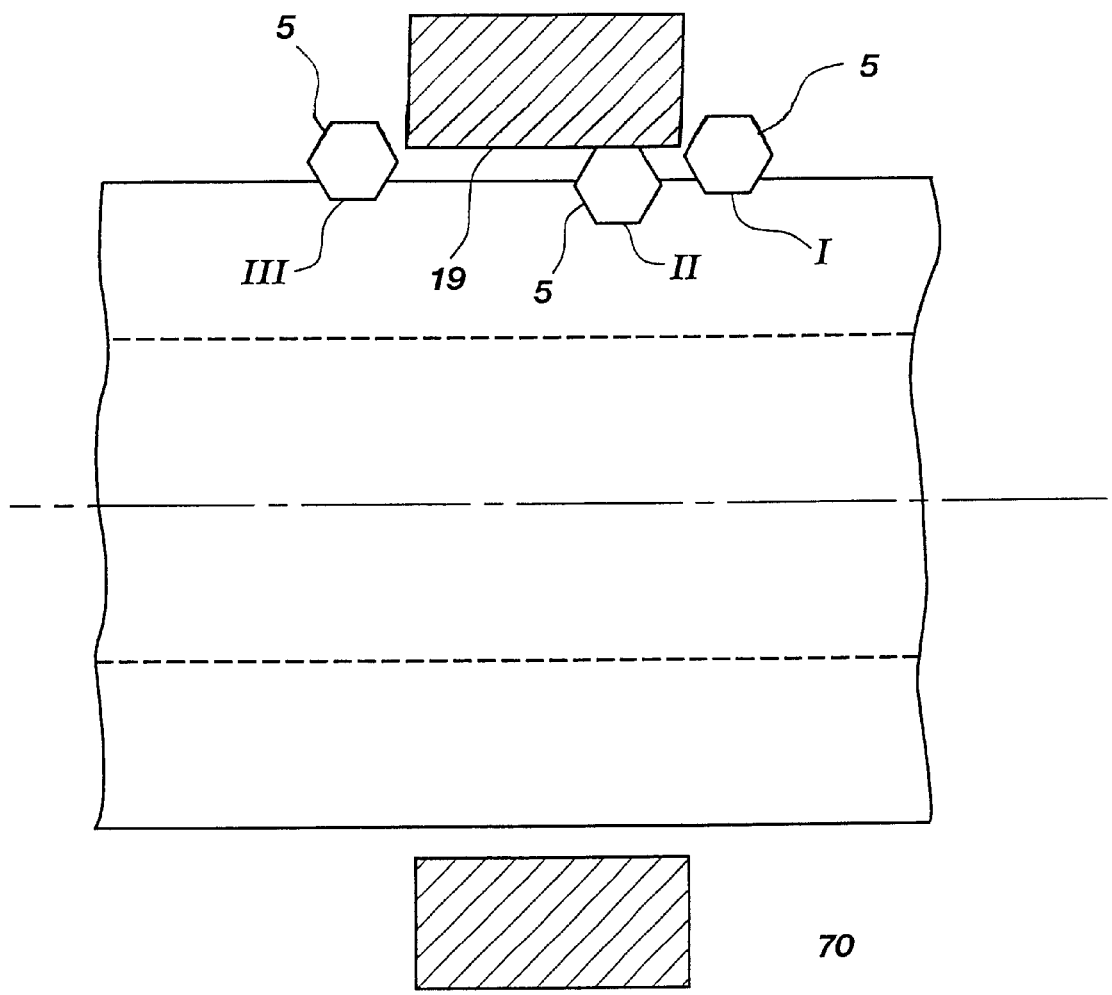
FIG. 7 is a partial longitudinal section through the boring bar of FIG. 6.

FIG. 7 illustrates how the bearing bores are chamfered. The tool 70 carries the necessary number of cutting devices 5. For chamfering the bearing bore 19, the cutting device 5 is radially set in a position larger than the inner diameter of the bearing bore (see position I of the cutting device 5). Next, the tool 70 is moved axially to realize the chamfer of the bearing bore. After this, the cutting device 5 is radially put back in a position to machine the bearing bore (see position II of the cutting device 5). The tool 70 is moved axially through the bearing bore to machine the surface of the bearing bore. After having finished the machining of the bearing bore, the cutting device 5 is moved outwardly of the bearing bore. The cutting device 5 is radially set in a position larger than the inner diameter of the bearing bore (see position III of the cutting device 5). The tool 70 is axially moved backwards (to the right) to realize a chamfer at the other side of the bearing bore 19.

What is claimed is:

1. A process for chip-removing machining of bore surfaces of a work piece that are spaced at a distance from one another in an axial direction, comprising the steps of:
   machining the two outermost bore surfaces to produce a bearing surfaces for the machining of additional bore surfaces; and
   inserting a boring bar eccentrically through one of the machined outermost bores into at least one bore positioned between the outermost bore surfaces; and
   attaching an opposing tool to the end of the bar which has passed through one of the machined outermost bores.

2. The process according to claim 1, wherein the method further comprises disposing a plurality of guides along the boring bar.

3. The process according to claim 2, wherein at least one guide of the plurality of guides is spring loaded.

4. A process for chip-removing machining of bore surfaces of a work piece that are spaced at a distance from one another in an axial direction, comprising the steps of:
   machining the two outermost bore surfaces to produce a bearing surfaces for the machining of additional bore surfaces; and
   inserting a boring bar through one of the machined outermost bores into at least one bore positioned between the outermost bore surfaces.

5. The process according to claim 4, wherein in the at least one bore disposed between outermost bores, at least one guide element is brought into contact with the bore surface to be machined.

6. The process according to claim 4, wherein the process further comprises inserting into at least one of the outermost machined bores, at least one guide element radially extending from the boring bar.

7. The process according to claim 6, wherein the at least one guide element comprises a guide bar.

8. The process according to claim 6, wherein a plurality of guide elements extend radially from the boring bar.

9. The process according to claim 4, wherein the process further comprises providing bore openings defining the bore surfaces with first and second chamfers by back and forth movement of the boring bar in an axial direction.

10. The process according to claim 4, wherein the process comprises premachining the bore surfaces between the outermost bores while the outermost bores are being machined.

11. The process according to claim 4, wherein the boring bar is eccentrically inserted into the bores.

12. The process according to claim 4, wherein the bore surfaces disposed between the outermost bores are machined simultaneously.

13. The process according to claim 4, wherein the process comprises inserting a guide sleeve into one of the outermost machined bores.

14. A process for chip-removing machining of bore surfaces of a work piece that are spaced at a distance from one another in an axial direction, comprising the steps of:
   machining of at least one of two outermost bore surfaces to produce a bearing surface for the machining of additional bore surfaces; and
   inserting a boring bar through one of the machined outermost bores into at least one bore lying between the outermost bore surfaces.

15. The process according to claim 14, wherein both of the outermost bore surfaces are machined.

16. The process according to claim 14, wherein one of the outermost bore surfaces is machined first and the workpiece with the bore surfaces is then pivoted 180° and the other outermost bore surface is machined.

17. The process according to claim 14, wherein the boring bar is inserted through one of the machined outermost bores and an opposite tool is inserted through the opposite outermost bore and the boring bar and tool are coupled together.

18. The process according to claim 17, wherein said opposite tool is a guide sleeve, which, after the boring bar has been inserted into the bore, is coupled with the boring bar's front end-as viewed in the insertion direction of the boring bar.

19. The process according to claim 17, wherein the work piece has a plurality of remaining bores and wherein the method further comprises only a first part of the boring bar being inserted through a machined bore into at least one of the other bores and that the opposite tool is inserted through the other machined bore into the remaining bores and is coupled with the first part.

20. The process according to claim 14, wherein the process comprises inserting a guide sleeve into an outermost machined bore.

21. The process according to claim 20, wherein the method comprises inserting the guide sleeve through the outermost machined bore.

22. The process according to claim 14, wherein the boring bar is eccentrically inserted into the bores.

23. The process according to claim 14, wherein the bore surfaces disposed between the outermost bores are machined simultaneously.

24. The process according to claim 14, wherein the process comprises premachining the bore surfaces between the outermost bores while the outermost bores are being machined.

25. The process according to claim 14, wherein the process further comprises providing bore openings defining the bore surfaces with first and second chamfers by back and forth movement of the boring bar in an axial direction.

26. The process according to claim 14, wherein the process further comprises inserting into at least one of the outermost machined bores, at least one guide element radially extending from the boring bar.

27. The process according to claim 26, wherein the at least one guide element comprises a guide bar.

28. The process according to claim 14, wherein in the at least one bore disposed between outermost bores, at least one guide element is brought into contact with the bore surface to be machined.

29. The process according to claim 13, wherein the method comprises inserting the guide sleeve through the outermost machined bore.

30. The process according to claim 29, wherein one of the outermost bore surfaces is machined first and the workpiece with the bore surfaces is then pivoted 180° and the other outermost bore surface is machined.

31. The process according to claim 4, wherein the boring bar is inserted through one of the outermost machined bores and an opposite tool is inserted through the opposite outermost bore and the boring bar and the opposite tool are coupled together.

32. The process according to claim 31, wherein the opposite tool comprises a guide sleeve, which, after the boring bar has been inserted through one of the outermost machined bores, is coupled with the boring bar adjacent the other outermost machined bore.

33. The process according to claim 31, wherein the work piece has a plurality of remaining bores and wherein the method further comprises only a first part of the boring bar being inserted through a machined bore into at least one of the other bores and that the opposite tool is inserted through the other machined bore into the remaining bores and is coupled with the first part.

* * * * *